(12) United States Patent
Vaghani et al.

(10) Patent No.: US 7,269,683 B1
(45) Date of Patent: *Sep. 11, 2007

(54) PROVIDING ACCESS TO A RAW DATA STORAGE UNIT IN A COMPUTER SYSTEM

(75) Inventors: Satyam B. Vaghani, Palo Alto, CA (US); Daniel J. Scales, Mountain View, CA (US)

(73) Assignee: VM Ware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/643,072

(22) Filed: Dec. 21, 2006

Related U.S. Application Data

(63) Continuation of application No. 10/897,050, filed on Jul. 21, 2004, now Pat. No. 7,155,558.

(51) Int. Cl.
*G06F 12/00* (2006.01)
(52) U.S. Cl. .......................... 711/4; 711/111; 711/147; 711/202; 711/220
(58) Field of Classification Search ..................... None
See application file for complete search history.

(56) References Cited

U.S. PATENT DOCUMENTS

| | | | |
|---|---|---|---|
| 6,240,511 B1 * | 5/2001 | Blumenau et al. ............. 713/1 |
| 6,449,652 B1 * | 9/2002 | Blumenau et al. ........... 709/229 |
| 6,931,440 B1 * | 8/2005 | Blumenau et al. ........... 709/220 |
| 6,993,581 B1 * | 1/2006 | Blumenau et al. ........... 709/225 |
| 6,993,589 B1 * | 1/2006 | Blumenau et al. ........... 709/229 |
| 2001/0011348 A1 * | 8/2001 | Blumenau et al. ........... 713/100 |
| 2004/0230787 A1 * | 11/2004 | Blumenau et al. ............. 713/1 |

\* cited by examiner

*Primary Examiner*—Kevin Verbrugge
(74) *Attorney, Agent, or Firm*—Darryl A. Smith

(57) ABSTRACT

A computer has access to a system-formatted data storage unit (DSU) containing a file system and to a raw DSU. A file within the file system constitutes a raw DSU mapping that facilitates access to the raw DSU. The raw DSU mapping appears to be an ordinary file to a storage user, but with the size of the raw DSU. An attempted access to the raw DSU mapping is translated into a corresponding access to the raw DSU. Access to the raw DSU by the storage user may be restricted to a specified region of the raw DSU, by defining an extent within the raw DSU mapping. The raw DSU mapping provides access to the raw DSU with many of the advantages of using a file system, including name persistency, permissions, persistent attributes, locking information for a distributed file system and other extended metadata.

11 Claims, 7 Drawing Sheets

PROVIDING ACCESS TO A RAW DATA STORAGE UNIT IN A COMPUTER SYSTEM

CROSS-REFERENCE TO RELATED APPLICATIONS

This application is a Continuation of U.S. patent application Ser. No. 10/897,050, filed 21 Jul. 2004 now U.S. Pat. No. 7,155,558.

BACKGROUND OF THE INVENTION

1. Field of the Invention

This invention relates to providing access to a raw data storage unit in a computer system, and, in particular, to providing such access along with some persistency.

2. Description of the Related Art

A "raw" data storage device is a data storage device that an operating system (OS) or other system-level software has allowed an application or other user-level software to use, without first creating a file system on the data storage device. The system software has no knowledge of the formatting or contents of the raw device. Thus, the raw device is a "black box" from the perspective of the system software. For example, a computer, having an OS and an application, may contain, or be connected in some manner to, a disk drive, a magnetic tape or some other data storage device, including, for example, a data storage device consisting of a plurality of LUNs (Logical Unit Numbers) within a SAN (Storage Area Network). If the OS has not placed a file system on the device, but the application has been allowed access to the device nonetheless, then the device is referred to as a raw device. In this case, the application may generally use the entire data storage device, storing and retrieving data in whatever format it chooses, without the constraints of a file system imposed by the OS. If an application or other user-level software places a file system on a data storage device, but the device does not contain a file system from the system software, then the device is nonetheless a raw device. A data storage unit (DSU), as described in greater detail below, is a uniquely identifiable data storage device or a uniquely identifiable portion of a data storage device. For example, in a SAN having multiple LUNs, with each LUN having a unique LUN ID (identification), each LUN is considered a DSU. Thus, a raw DSU is a DSU on which system-level software has not placed a file system or other system data.

For the purpose of this patent, if a DSU contains a file system, even one created by user-level software, then the DSU is referred to as a "formatted" DSU. Thus, for the purpose of this patent, a DSU is not considered a "formatted" DSU merely because it has some lower level formatting. If system-level software has placed a file system on a DSU, then the DSU is referred to as a "system-formatted" DSU.

Raw DSUs may be advantageously used in a variety of situations, in a variety of computer systems. For example, raw disks can utilize advanced block-level SAN hardware features. Also, a server computer running a database application may be connected to a raw data storage device, so that the database application may use the entire raw device for data storage in a format that is custom to the database application and that is optimized for the database application. The database application may use the storage space of a raw device more efficiently than a system-formatted device because of a reduction in data overhead, and the setup and use of the raw device may be faster without any intervention by the system software. Also, use of a raw device may lead to greater flexibility in some situations. For example, a raw device may be transferred from one computer system to another, without the constraints of a system-formatted file system.

System-formatted data storage devices provide numerous other advantages over the use of raw devices, however. One simple, but important advantage is the ability to use persistent names that are managed in a coherent local or global namespace system-wide. For example, if a computer is connected to a plurality of data storage devices and the computer is rebooted, then, after the reboot, the system software on the computer can read the file system on a system-formatted device to determine its contents, including the name of the device itself and the names of all directories and files on the device. The system software can then use these names and other information to find and access desired data, and to enable user-level software to find and access desired data. The file system on a system-formatted device also allows for the use of permissions/access control information. In contrast, for a raw device, the system software has no such structure from which to determine the device's identity and contents. In many situations, this lack of name persistency and various other limitations of raw devices may cause a variety of problems in existing computer systems, as partially described below. FIGS. 1A and 2 show two different computer systems that include raw LUNs. Each of these computer systems may encounter problems using the raw LUNs under existing system software, in some situations.

FIG. 1A shows a computer system comprising a plurality of computers, including a first computer 10A, a second computer 10B and a third computer 10C, connected to a SAN 30. The SAN 30 comprises a first LUN 34A, a second LUN 34B and a third LUN 34C. In the example of FIG. 1A, the first LUN 34A is system-formatted, with a file system, while the second LUN 34B and the third LUN 34C are raw devices. The LUNs 34A, 34B and 34C may be from any of various types of data storage devices, such as disks or tapes, or some combination of different types of devices. FIG. 1A shows a conventional Fibre Channel network 32 providing an interface between the computers 10A, 10B and 10C and the LUNs 34A, 34B and 34C, although other data interfaces, either simpler or more complex, may also be used.

As shown in FIG. 1A, the system-formatted LUN 34A includes a conventional partition table 33A and a single partition 35A. The partition 35A includes a file system 36, including a directory 38 and a plurality of files, including a first file 40, a second file 42 and a third file 44. The file system 36 may be virtually any type of file system, such as a conventional file system. Various other structures or organizations for the system-formatted LUN 34A are also possible. For this description, the primary relevant characteristics of the LUN 34A are that the LUN is system-formatted, so that it contains a file system, with one or more files. The LUN 34B also includes a conventional partition table 33B, along with a first partition 35B and a second partition 37B. The LUN 34C is shown without any partition table or any distinct partitions. Together, the LUNs 34B and 34C illustrate the fact that raw data storage devices may either be divided into multiple partitions or they may be left as a single data storage area.

The computers 10A, 10B and 10C may be substantially the same as each other, or they may be quite different. The computer 10A, for example, may comprise conventional computer hardware 20, including one or more processors, system memory, etc. The computer hardware 20 may include, in particular, a first host bus adapter (HBA) 22A and a second HBA 22B for interfacing with the SAN 30. Alternatively, the computer hardware 20 may include other interface cards or devices for interfacing with other types of data storage devices or networks.

The computer 10A also includes system software 14 running on the computer hardware 20 and a set of applications 12, including a particular application 12A, running on the system software 14. The system software 14 may include any of a wide variety of OSs, such as a version of a Windows OS from Microsoft Corporation or a distribution of Linux. The system software 14 may also include other system software, such as an advanced storage multipath manager or other software units that provide other basic or advanced capabilities. In this patent, system software may be referred to as an OS for simplicity, although any reference to an OS is not intended to preclude software that provides other functionality that is not generally included in a basic OS.

The system software 14 provides functionality for managing interactions with attached or otherwise accessible data storage devices. This functionality may be conceptually grouped together into a generalized functional unit, which will be referred to as a data storage manager 50A. Thus, the data storage manager 50A shown in FIG. 1A manages interactions between the application 12A and the LUNs 34A, 34B and 34C, for example. As one particular example, the data storage manager 50A may enable the application 12A to read from and/or write to the first file 40 on the first LUN 34A. The data storage manager 50A may also enable the application 12A to read from and/or write to the second LUN 34B, as another example.

The functions provided by the data storage manager 50A may be conceptually divided into a plurality of more specific functional groups, each of which may be represented by a different functional unit. Thus, as shown in FIG. 1B, the data storage manager 50A may include some or all of the following functional units: an advanced file manager 52A, a file system manager 54A, a storage device manager 55A, a storage path manager 56A and a HBA driver 58A. The data storage manager 50A may also include additional functionality that might not be included in any of these functional groups. Actual implementations of data storage managers are not necessarily divided into these functional units.

The HBA driver 58A may be a conventional HBA driver that provides an interface with the HBAs 22A and 22B, sending data to the respective HBAs and retrieving data from the HBAs. The storage path manager 56A may be a conventional multipath manager, selecting a path through the Fibre Channel network 32, possibly providing various advanced functions such as automatic failovers and failbacks, as well as load distribution functions. The storage device manager 55A manages the interface to particular storage devices. For example, if the LUN 34A is a different type of storage device than the LUN 34B, then the storage device manager 55A generally interfaces with the two devices in a different manner.

The file system manager 54A may be a conventional file system manager, such as one found in conventional OSs. As is well known, file system managers provide a wide variety of functions related to interfacing with a file system, including providing a namespace for addressing files and providing access control functions. The file system manager 54A may enable the application 12A to open and then read from and/or write to the first file 40, for example. The advanced file manager 52A provides advanced functions for interfacing with a file system. For example, the advanced file manager 52A may provide a copy-on-write (COW) function for interfacing with files. Thus, for example, a COW function may be used to create a redo log for the first file 40. Redo logs (or delta logs) are known in the art and are described in greater detail below.

The functionality of the data storage manager 50A has been implemented in a variety of existing computer systems, any implementation of which may be used for the data storage manager 50A of FIGS. 1A and 1B. The data storage manager 50A may be implemented as a single software unit or as a combination of multiple software units and/or of portions of one or more software units. As another alternative, portions of the data storage manager 50A may be implemented in hardware. The data storage manager 50A may be quite complex, providing a wide variety of both simple and complex functions, or it may be simpler and provide some subset of such simple and complex functions. The data storage manager 50A may be comprised of standard software routines, including those found in a conventional OS, such as a Windows OS or a Linux distribution, or it may be a custom software unit designed specifically for a particular implementation.

Referring again to FIG. 1A, suppose that the system software 14 comprises a Linux distribution and the application 12A is a database application. Suppose further that the raw LUN 34C contains a database that is managed by the application 12A, and that the LUN 34C has been given the name /dev2 based on a prior scan of data storage devices accessible through the Fibre Channel network 32. Thus, suppose, as is common practice, that the application 12A accesses the database on the LUN 34C using the name /dev2.

Now suppose, for some reason, the computer 10A is rebooted, such as because of a power failure. As is well known, the LUN 34C may not be given the same name, dev2, the next time the system software 14 scans accessible storage devices. For example, if an additional data storage device has been attached to the computer 10A or to the SAN 30, depending on the order in which the storage devices are discovered by the system software 14, the LUN 34C may be given a different name, such as the name /dev3, for example. Thus, this name given to a raw LUN by the system software is a nonpersistent name, meaning that it may change the next time the system software is rebooted or otherwise scans for accessible storage devices. Suppose, then, that the LUN 34B is given the name /dev2 this time around. Now, if the application 12A attempts to access the database using the name /dev2, the application will actually be accessing the LUN 34B, instead of the LUN 34C. Thus, the application 12A will not find the data that it is looking for and/or the application may corrupt the data that is stored on the LUN 34B.

As another example, suppose the computer 10A again has system software 14 that comprises a Linux distribution and that the computer 10A is set up to boot off the raw LUN 34C. If something happens that causes the LUN 34C to be discovered at a different position in the sequence of discovered storage devices, the computer 10A may not even be able to boot up successfully. Many experienced and knowledgeable computer users that have used raw disks have encountered these problems, or a wide variety of other problems based on the limitations of raw devices.

FIG. 2 illustrates another computer system that includes raw devices and that can have similar problems with the use of the raw devices. The computer system of FIG. 2 also includes a plurality of computers, including a first computer 10G and a second computer 10H. The computers 10G and 10H are connected to the same Fibre Channel network 32 as is illustrated in FIG. 1A, which provides access to the same system-formatted LUN 34A and the same raw LUNs 34B and 34C, which are also illustrated in FIG. 1A. The computers 10G and 10H may be substantially the same as each other and as the computer 10A, or they may be quite different. For example, the computer 10G may comprise the same computer hardware 20 as the computer 10A, including the same HBAs 22A and 22B.

Some of the software that is loaded onto the computer 10G is different, however, from the software that is loaded onto the computer 10A. In this example, the computer 10G is used to host a virtual computer system. Thus, a kernel 68 for the virtual computer system is loaded onto the computer hardware 20. The kernel 68 supports one or more virtual machine monitors (VMMs), such as a first VMM 64A and a second VMM 64B. Each of the VMMs in this system supports a single virtual machine (VM), although other configurations are also possible. Thus, the first VMM 64A supports a first VM 63A and the second VMM 64B supports a second VM 63B. Any of a wide variety of known or new virtual computer systems may be implemented in the computer 10G. The computer 10H, along with other possible computers in the computer system, may also implement virtual computer systems, although this is not necessary.

Going into more detail, the kernel 68 includes a number of software modules for supporting both the VMMs 64A and 64B and the VMs 63A and 63B, including a virtual storage manager 69 and a data storage manager 50B. The virtual storage manager 69 allocates available data storage resources between the multiple VMs in the virtual computer system, including the VMs 63A and 63B. The virtual storage manager 69 may present the data storage resources allocated to a VM as one or more virtual LUNs, or in some other form. The data storage manager 50B may include substantially the same functionality as the data storage manager 50A. Thus, the data storage manager 50B may include an advanced file manager, a file system manager, a storage device manager, a storage path manager and a HBA driver, which may be substantially the same as the corresponding functional units illustrated in FIG. 1B and described above.

The VMM 64A may also include a number of software modules for supporting the VM 63A. For example, the VMM 64A may include emulation software that exports virtual hardware 60 for the VM 63A. The virtual hardware 60 may implement any of a wide variety of different computer architectures. For example, the virtual hardware 60 may implement the same hardware platform as the underlying physical computer hardware 20. In particular, the VMM 64A may include a HBA emulator 66 for exporting a virtual HBA 62 within the virtual hardware 60. The VMM 64B may be substantially the same as the VMM 64A, or it may be substantially different.

The VM 63A may be loaded with guest system software and user software, just like a physical computer system. Thus, for example, the same system software 14 and the same applications 12 that were described above in connection with FIG. 1A may be loaded onto the virtual hardware 60. In this case, however, the "guest system software" 14 within the VM 63A is not considered system software with respect to the physical computer hardware 20 or the LUNs 34A, 34B and 34C, because the guest system software 14 has no control over system-level functions within the actual hardware. Instead, in relation to the physical hardware of the computer system, the guest system software 14 is considered user-level software. Thus, if the guest system software 14 creates a file system on the raw LUN 34C, for example, the raw LUN 34C remains a raw LUN and does not become a system-formatted LUN. In this case the kernel 68 is the system-level software with respect to the physical hardware, and only the kernel 68 can add a file system to a raw DSU to convert it into a system-formatted DSU.

The virtual computer system implemented within the computer 10G may use any of the LUNs 34A, 34B and 34C in a wide variety of manners. For example, the virtual storage manager 69 may allocate the entire raw LUN 34C for use by the VM 63A. The virtual storage manager 69 may present the LUN 34C as a virtual raw LUN within the VM 63A, and it may present it as the only LUN accessible to the VM 63A. The system software 14 in the VM 63A might boot up off the raw LUN 34C, and/or software within the VM 63A, such as one of the applications 12, might access data on the LUN 34C, accessing the LUN through the virtual HBA 62. As another alternative, the virtual storage manager 69 may allocate a partition of the raw LUN 34B for use by the VM 63A and present it as an entire virtual raw LUN.

The virtual computer system implemented within the computer 10G may run into problems that are similar to the ones described above with respect to the computer system illustrated in FIG. 1A. Thus, for example, if the computer 10G is rebooted for some reason, the virtual storage manager 69 may identify the wrong raw LUN as the LUN that has been allocated to the VM 63A, based on the order in which the data storage devices are discovered during a scan of accessible data storage devices by the data storage manager 50B. Thus, the VM 63A may attempt to reboot from the wrong LUN and/or the applications 12 may attempt to access data on the wrong LUN. Accordingly, a variety of things can go wrong, such as the VM 63A not booting correctly or one of the applications 12 corrupting data on one of the LUNs.

What is needed therefore is a better way to provide access to a raw DSU, one that overcomes some of the current limitations on the use of raw DSUs. For example, it would be advantageous to provide access to raw DSUs in a manner that provides a persistent naming capability.

SUMMARY OF THE INVENTION

This invention comprises a computer program embodied in a tangible, computer-readable medium, where the computer program performs a method for providing access to a raw data storage unit (DSU) in a computer system. The computer system comprises a computer, a system-formatted DSU containing a file system, the raw DSU having a unique identification (ID), and one or more data storage interfaces for providing one or more storage users within the computer with access to the system-formatted DSU and the raw DSU. The method comprises the steps of: creating a raw DSU mapping (RDM) file with a persistent name within the file system on the system-formatted DSU, the RDM containing the unique ID of the raw DSU and an indicator indicating that the file is a RDM; resolving the unique ID to a current name for the raw DSU; receiving an attempted access to the RDM file at a RDM offset; and sending a corresponding attempted access to the raw DSU at a raw DSU offset, the raw DSU offset corresponding to the RDM offset.

In some embodiments of the invention, the raw DSU is an entire data storage device, while in other embodiments, the raw DSU is a logical unit number (LUN) within a data storage device comprising multiple LUNs. In some embodiments, the raw DSU and the system-formatted DSU are in different data storage devices. In other embodiments, the raw DSU and the system-formatted DSU are both LUNs within a storage area network (SAN). In other, more particular, embodiments, an extent is defined within the RDM as a portion of the raw DSU and the method further comprises blocking attempted accesses to the RDM that would access data outside of the extent. In some such embodiments, the raw DSU offset is determined by adding the RDM offset to an extent offset.

In other embodiments, the RDM also contains permissions information for restricting access to the raw DSU, and the method also comprises blocking attempted accesses to the RDM that do not satisfy the restriction of the permissions information. In still other embodiments, the RDM also contains locking data for a distributed locking system, and the method also comprises obtaining a lock for the raw DSU prior to attempting to access the raw DSU. Also, in other embodiments, the method further comprises using copy-on-write (COW) technology with the RDM file, in a manner that effectively uses COW technology with the raw DSU. Finally, in some embodiments, a virtual computer system is implemented within the computer.

DETAILED DESCRIPTION

This invention may be used in a wide variety of computer systems to provide access to a uniquely identifiable raw data storage device, such as a disk or a tape device, or to a uniquely identifiable raw portion of a data storage device. A wide variety of existing OSs and other system software implementations may be modified by a person of skill in the art to implement this invention, based on the following description. The invention may be implemented in a wide variety of virtual computer systems, such as the system illustrated in FIG. 2, and in a wide variety of computer systems that do not implement virtual computer systems, such as the system illustrated in FIG. 1A. The primary requirements for implementing the invention are a computer, or other electronic device, having access to a file system and to a separate, uniquely identifiable raw data storage device, or to a uniquely identifiable raw LUN or other raw portion of a data storage device.

Figure 3B:
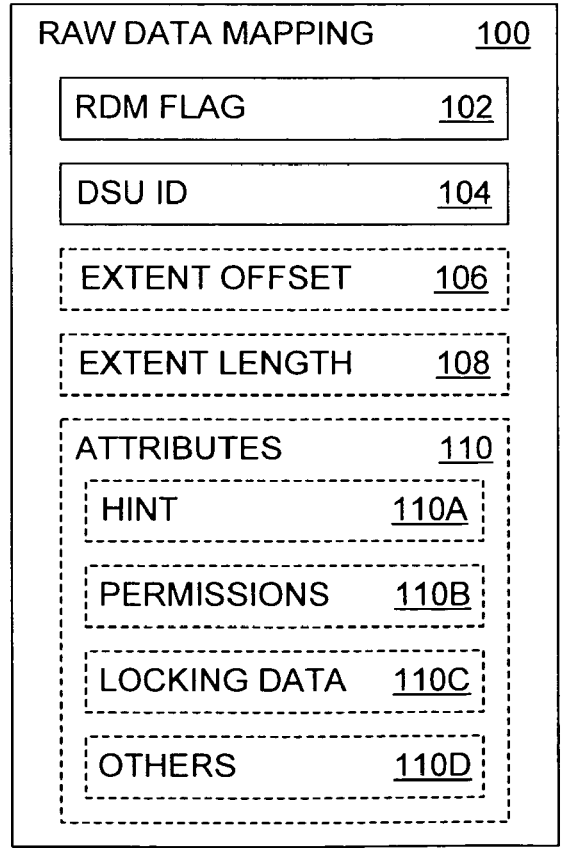
FIG. 3B illustrates a raw DSU mapping (RDM) of FIG. 3A in greater detail.
Figure 2:
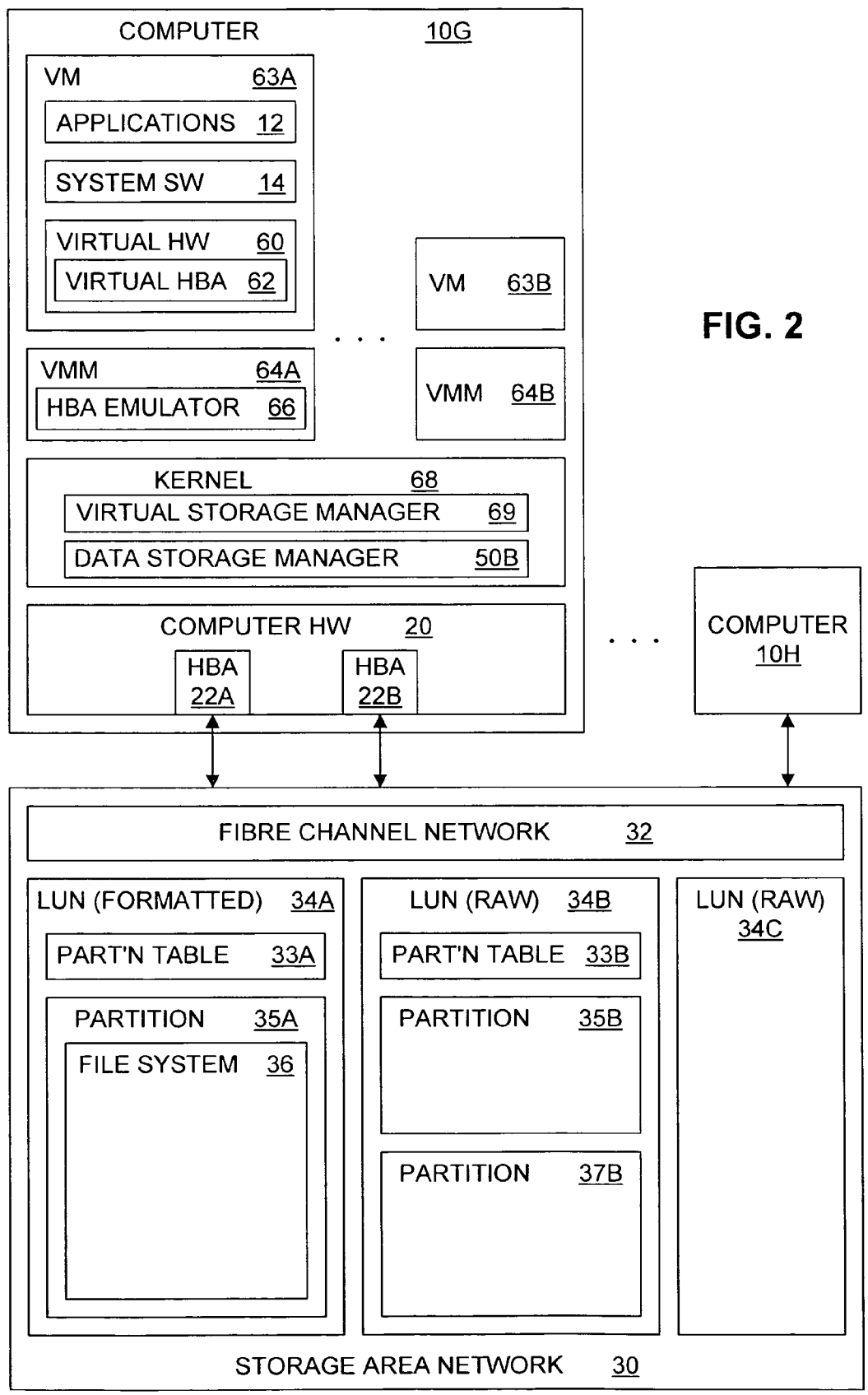
FIG. 2 illustrates a second computer system in which the invention may be implemented, wherein a computer that has access to a system-formatted LUN and a couple of raw LUNs implements a virtual computer system.
Figure 3A:
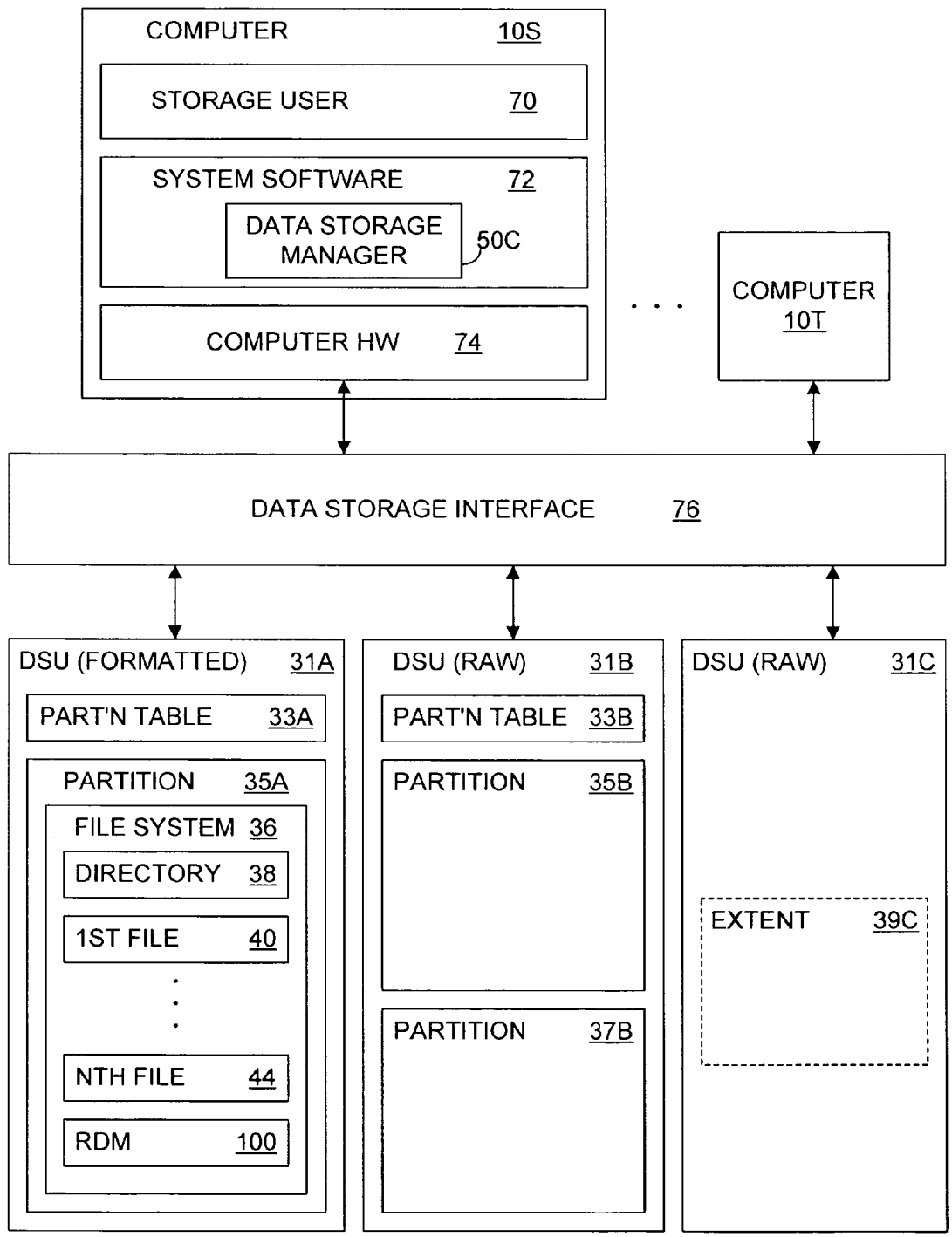
FIG. 3A illustrates a third, more generalized computer system in which a computer has access to a system-formatted data storage unit (DSU) and a couple of raw DSUs, and wherein the invention is used to provide access to one of the raw DSUs.

FIG. 3A illustrates a generalized computer system in which the invention is implemented. The computer system of FIG. 3A may represent either a virtualized computer system or a non-virtualized computer system. FIG. 3A shows a plurality of computers, including a first computer 10S and a second computer 10T. The computers 10S and 10T may be substantially the same as each other, or they may be substantially different; and they may be substantially the same as the computer 10A of FIG. 1A or the computer 10G of FIG. 2, or they may be substantially different from either of these other computers. As illustrated in FIG. 3A, the computer 10S comprises computer hardware 74, which may be the same as the conventional computer hardware 20 of the computers 10A and 10G of FIGS. 1A and 2, respectively, or it may be substantially different.

Figure 1A:
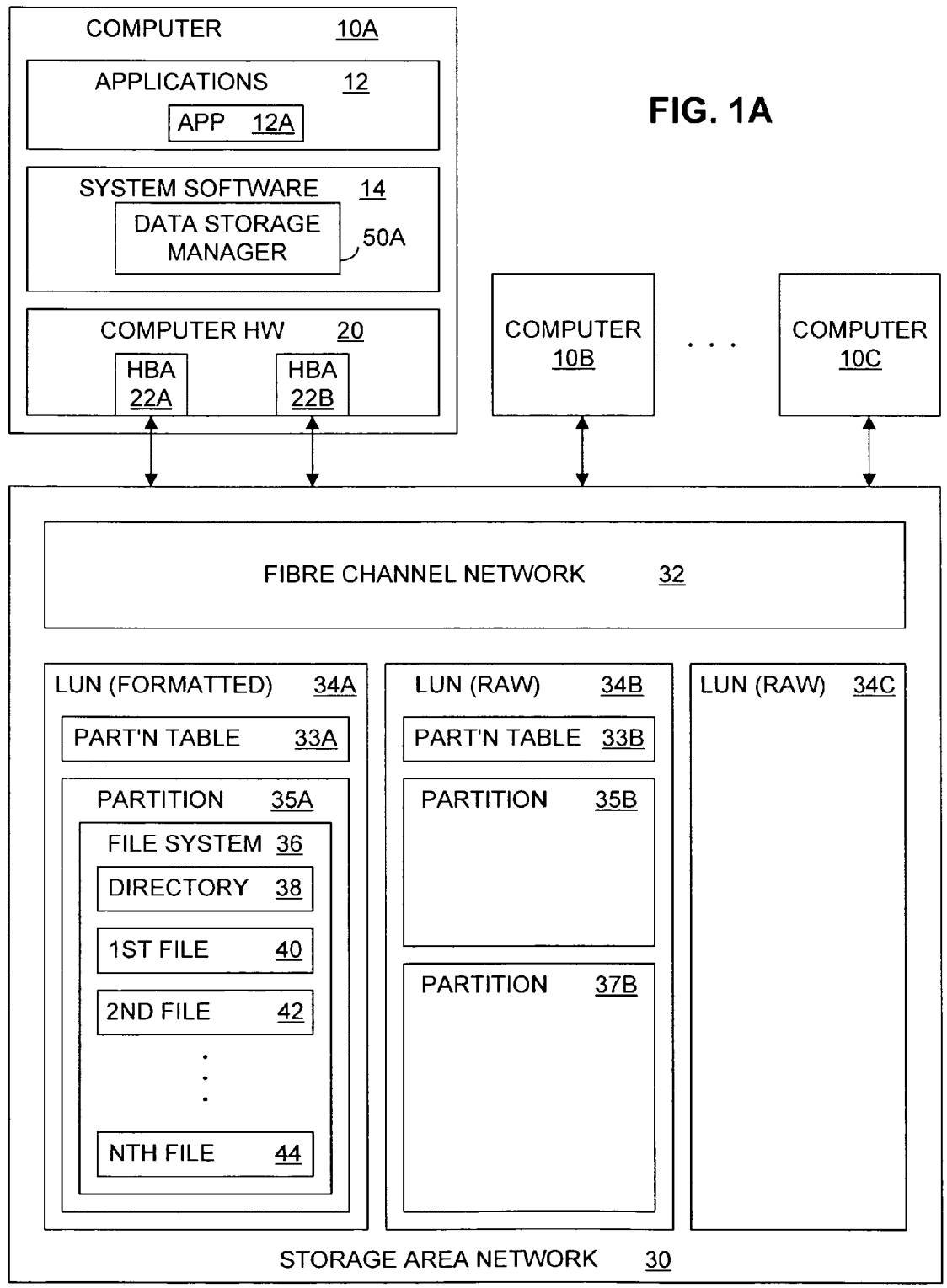
FIG. 1A illustrates a first computer system in which the invention may be implemented, wherein a computer has access to a system-formatted LUN and a couple of raw LUNs.

The computer 10S is loaded with system software 72, which may be the same as the system software 14 of the computer 10A of FIG. 1A, or it may be different. The system software 72 may alternatively be the same as the kernel 68 in the virtual computer system of FIG. 2, or it may be some other virtualization software. Generally, the system software 72 may be any of a wide variety of software units or groups of software units that have access to restricted aspects of the physical system hardware and provide system level functions for higher levels of software, such as user-level applications. More particularly, the system software 72 may be any of a wide variety of system software that provides some or all of the functionality of the data storage manager 50A.

Figure 1B:
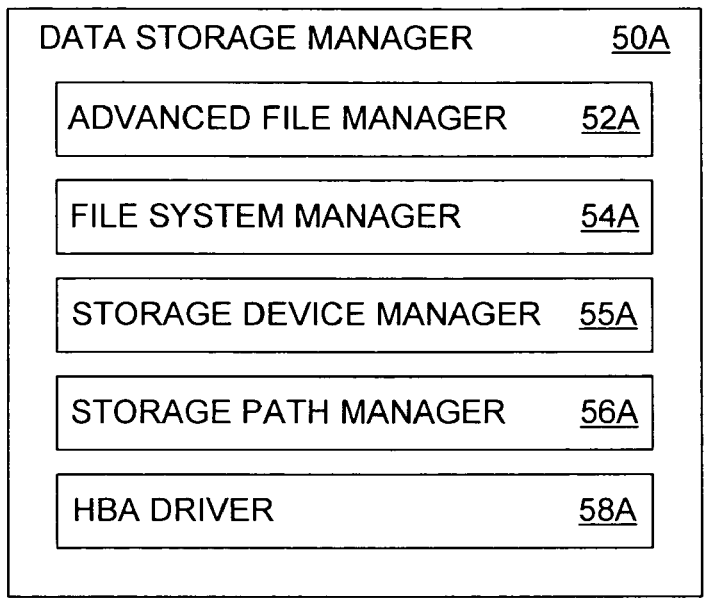
FIG. 1B illustrates a data storage manager of FIG. 1A in greater detail.

As illustrated in FIG. 3A, the system software 72 includes a data storage manager 50C, which may be substantially the same as the data storage manager 50A, except as described below for implementing this invention. In particular, the data storage manager 50C may have some or all of the functional units that constitute the data storage manager 50A, such as the advanced file manager 52A, the file system manager 54A, the storage device manager 55A, the storage path manager 56A and the HBA driver 58A, as illustrated in FIG. 1B, although some of these functional units are modified as described below to implement the invention.

The system software 72 supports a storage user 70. The storage user 70 may be any software entity or group of software entities that may use a raw data storage device. For example, the storage user 70 may be the application 12A illustrated in FIG. 1A. Alternatively, the storage user 70 may comprise the VM 63A illustrated in FIG. 2.

FIG. 3A also shows three Data Storage Units (DSUs) 31A, 31B and 31C. A DSU, as used herein, is any distinctly identifiable entity or unit in which data may be stored in a persistent or non-volatile manner. A DSU may be an entire data storage device, of any type, such as a single disk drive, a disk array or a tape device, or it may be some portion of a data storage device that may be distinctly identified, such as by using a unique ID. Thus, for example, a DSU may be an entire disk array or it may be a LUN within a disk array. For this description, suppose that the DSUs 31A, 31B and 31C are LUNs, and the DSUs 31B and 31C are the same as the LUNs 34B and 34C, respectively, while the DSU 31A is substantially the same as the LUN 34A, except as described below for implementing the invention.

FIG. 3A also shows a data storage interface 76, which provides an interface between the computers 10S and 10T and the DSUs 31A, 31B and 31C. The data storage interface 76 may be the same as the Fibre Channel network 32 illustrated in FIGS. 1A and 2, or it may be different. The data storage interface 76 may be simpler or more complex than a conventional Fibre Channel network. As another example, the data storage interface 76 may comprise a simple SCSI interface (Small Computer System Interface). The primary characteristic of the data storage interface 76 that is relevant to this description is that it must provide some sort of interface between a computer and one or more data storage devices or networks.

Similar to the LUNs 34A, 34B and 34C described above in connection with FIGS. 1A and 2, the DSU 31A is a system-formatted DSU and the DSUs 31B and 31C are raw DSUs. The DSU 31B includes the partition table 33B, the first partition 35B and the second partition 37B, while the DSU 31C contains no partitions or partition tables. The DSU 31A contains the partition table 33A and the single partition 35A. The partition 35A contains the file system 36, including the directory 38 and a plurality of files, including the files 40 and 44.

The system-formatted DSU 34A has a file system that was created by the system software 72, typically including an identifying label. Regardless of the order in which data storage devices are discovered when scanned, the system software 72 is able to identify the DSU 34A using the label, or other such information. The system software 72 is then able to recognize the structure of the file system and then present the file system to user-level software, including the storage user 70. The user-level software may then use the file system to find and access desired data.

The file system 36, as shown in FIG. 3A, also includes a raw DSU mapping (RDM) 100. The RDM 100, which is used in implementing this invention, is a file, having a format that conforms to the requirements of the file system 36. The data contained in the RDM 100, however, is specific to this invention. This data is described below. The file system 36 may also include additional raw DSU mappings similar to the RDM 100, but just one mapping is shown for simplicity. The raw DSU mappings are generally created, managed and used by the functional units of the data storage manager 50C, especially the file system manager 54A. Thus, existing data storage managers, and file system managers, in particular, may be modified, according to the information provided below, to implement this invention.

Now suppose that it is desirable to provide the storage user 70 with access to all or some portion of a raw data storage device, such as either the raw DSU 31B or the raw DSU 31C. This invention provides a new way to enable a software entity to access a raw data storage device, using a raw DSU mapping, such as the RDM 100. Thus, for example, the RDM 100 may be used to enable the storage user 70 to access the raw DSU 31C. Alternatively, the RDM 100 may be used to enable the storage user 70 to access a predetermined portion of the raw DSU 31C.

The contents of the RDM 100 are illustrated in FIG. 3B. The RDM 100 includes a RDM flag 102 and a DSU ID 104. The RDM 100 may also include an extent offset 106, an extent length 108 and a set of attributes 110, including a hint field 110A, a set of extra access rights/permissions 110B, a set of locking data 110C and other attributes 110D. The extent offset 106, the extent length 108 and the set of attributes 110, including the hint field 110A, the set of extra permissions 110B, the set of locking data 110C and the other attributes 110D are all shown in FIG. 3B with dashed lines to indicate that these fields are optional in implementing the invention. The RDM 100 may also contain additional fields, as desired.

The RDM flag 102 is a flag, or some other indicator, that is set to indicate that the file contains a raw DSU mapping, to distinguish raw DSU mappings from other files in the file system. The RDM flag 102 may be integrated within the format of the file system 36, so that a single file-type indicator is used to determine a type for a specific file within the system, with one possible file type in the file system being a raw DSU mapping. The DSU ID field 104 contains a unique, persistent ID for a DSU for which the RDM 100 is facilitating access. The unique ID contained in the DSU ID field 104 should preferably be unique among all DSUs that are accessible along with the data storage device containing the raw DSU mapping. The DSU ID may be a unique device ID, such as a SCSI disk ID, or it may be a unique LUN ID, for example. Thus, in the example described above, in which the RDM 100 facilitates access to the DSU 31C, the DSU ID field 104 of the RDM 100 contains a unique ID for the DSU 31C.

The optional extent offset field 106 and extent length field 108 may be used to limit the storage area within a raw DSU to which access is provided by a particular raw DSU mapping. For example, the extent offset 106 and the extent length 108 of the RDM 100 may be used to specify an accessible extent that covers any subset of the entire DSU 31C, such as an extent 39C as illustrated in FIG. 3A. The extent 39C, for example, may cover one quarter of the raw DSU 31C, with the accessible one-quarter beginning at the middle of the raw DSU, so that access is not provided under this RDM 100 to the first half of the raw DSU or the last quarter of the DSU. The extent offset field 106 is used to specify the beginning of an extent to which access is provided and the extent length field 108 is used to specify the data storage area covered by the extent. Thus, to provide access to the third quarter of the raw DSU 31C, the extent offset field 106 would contain a value that indicates the midpoint of the raw DSU and the extent length field 108 would indicate a quarter of the raw DSU. Thus, for example, for a 400 gigabyte (GB) raw DSU, the extent offset field 106 would contain a value representing 200 GB and the extent length field 108 would contain a value representing 100 GB. Other raw DSU mappings may define other extents within the DSU that provide access to the first half and the last quarter of the raw DSU. Numerous other configurations of raw data extents are also possible. Creating multiple extents within a single raw DSU can provide different storage users with access to different portions of a raw DSU using different raw DSU mappings. An extent may also be configured to coincide with a partition that has already been placed on a raw DSU, to provide access that is limited to the partition. Thus, for example, an extent may be created within a raw DSU mapping that coincides with the offset and length of the partition 37B in the raw DSU 31B to provide access only to the partition 37B.

A raw DSU mapping may alternatively provide access to an entire raw DSU, either by not including the optional extent offset field 106 and extent length field 108 or by specifying the entire raw DSU using these fields. Thus, for example, access may be provided to an entire 400 GB raw DSU by specifying an extent offset of zero and an extent length of 400 GB. In the example described above, if the storage user 70 is to have access to the entire DSU 31C, then the extent offset field 106 of the RDM 100 may be set to zero and the extent length field 108 may be set to represent the entire storage area of the raw DSU 31C.

The attributes field or group of fields 110 may contain a wide variety of information, including many types of information that are included in the metadata of other file types. For example, the attribute fields 110 may include a hint field 110A that may contain a nonpersistent name for the raw DSU 31C, or for the extent 39C. When a raw DSU mapping is created, and optionally at other times, the data storage manager 50C may copy a then-current nonpersistent name used by the system software 72 for the mapped DSU into the hint field 110A. This nonpersistent name may be dependent on the order in which data storage devices are discovered during a scan, so that the nonpersistent name used by the system software may change any time the devices are scanned. Thus, for example, the nonpersistent name may be a /dev name, such as /dev3. Suppose, for example, that when the RDM 100 is created, the raw DSU to which the RDM 100 is to map has a nonpersistent name of /dev3, and that this name is copied into the hint field 110A. Later, when the RDM 100 is used to access the raw DSU, the data storage manager 50C may use the nonpersistent name in the hint field 110A as a hint as to which DSU the RDM 100 maps. If, however, the nonpersistent name of the mapped DSU has changed since the hint field 110A was last written, then the hint field 110A is not accurate. The data storage manager 50C may test the DSU having the name indicated in the hint field 110A to determine whether it has a unique ID that matches the DSU ID field 104. If there is a match, then the data storage manager 50C has found the DSU to which the RDM 100 maps. If not, then the data storage manager 50C must resolve the DSU ID 104 to a current name for the mapped DSU, as described below.

The attribute fields 110 may also include extra permissions information 110B. The file system 36 typically already implements access rights/permission checking, which is applied to the RDM 100 because the RDM 100 is a file in the file system. However, the permissions field(s) 110B may contain additional permissions information for additional access rights checking. The attribute fields 110 may also include fields 110C for implementing a lock on the raw DSU by using the functionality of a distributed file system, such as the owner and time fields described in U.S. patent application Ser. No. 10/773,613 ("the '613 application"), entitled "Providing Multiple Concurrent Access to a File System", which is incorporated here by reference.

Figure 4:
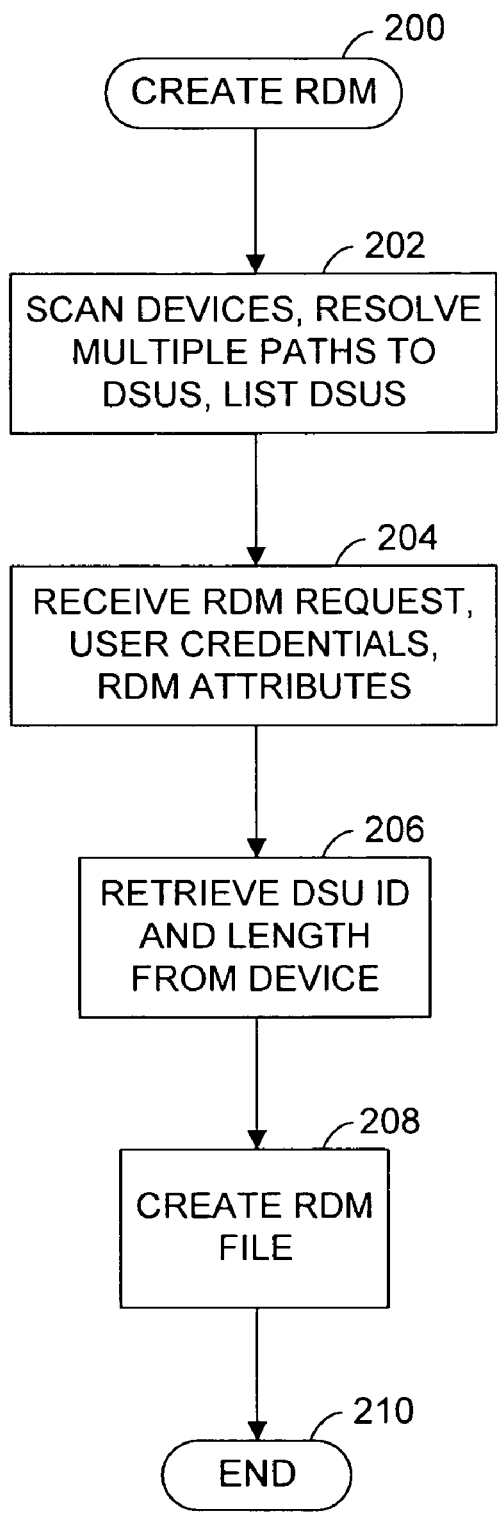
FIG. 4 illustrates a method according to the invention for a data storage manager to create a raw DSU mapping for a raw DSU.
Figure 5:
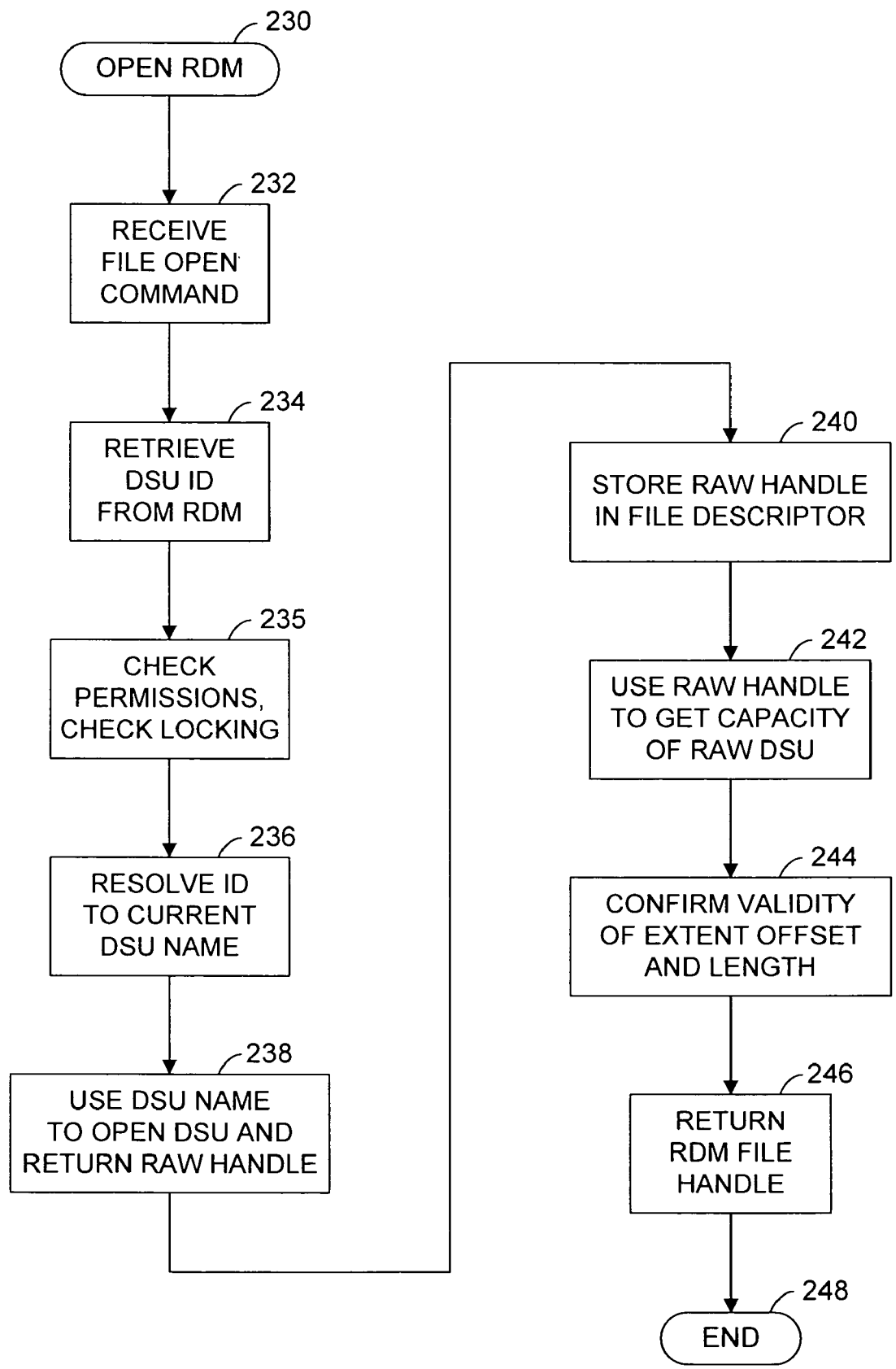
FIG. 5 illustrates a method according to the invention for a data storage manager to respond to a request from a storage user to open a raw DSU mapping, and provide the storage user with access to the corresponding raw DSU.
Figure 6:
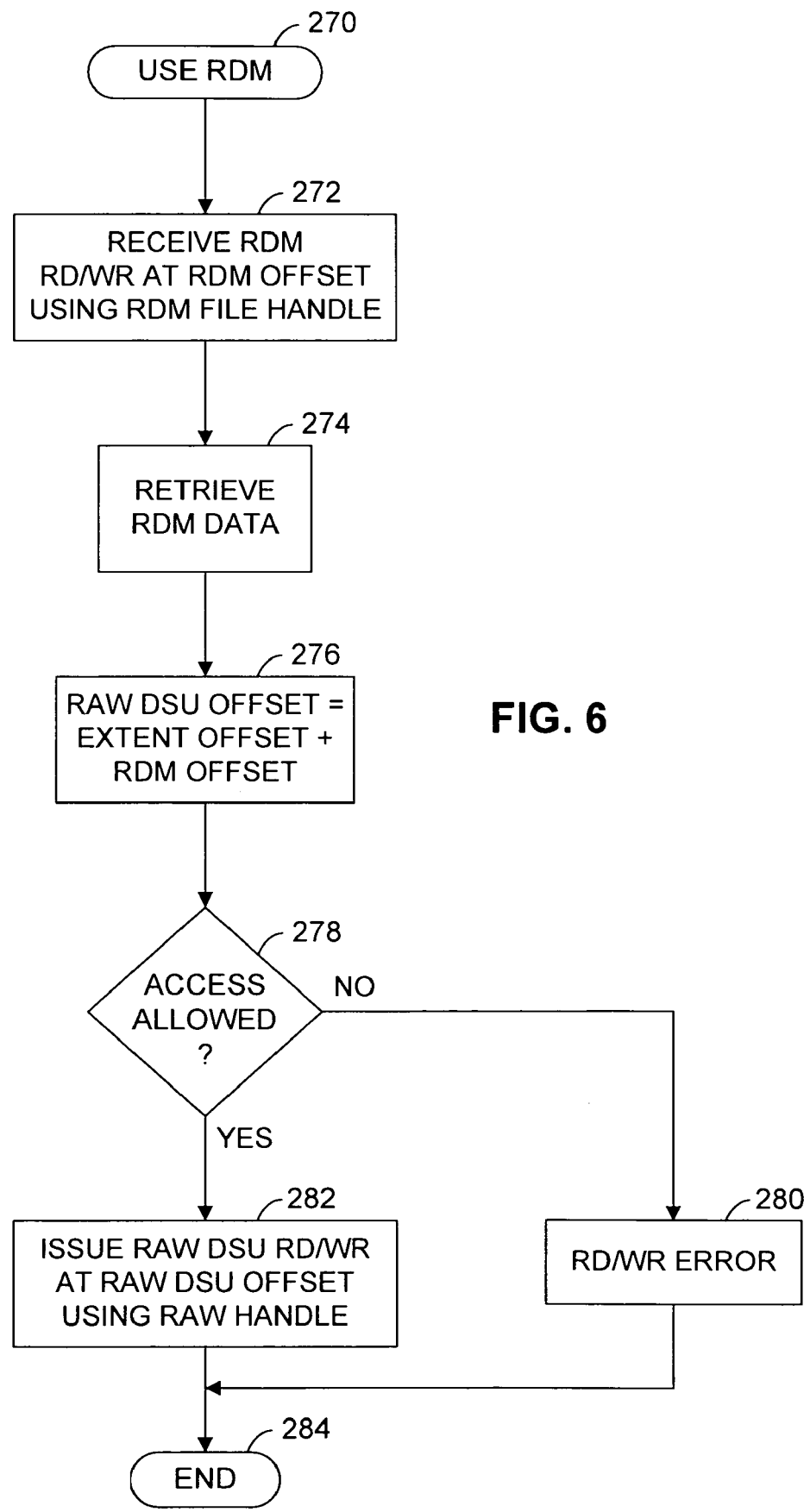
FIG. 6 illustrates a method according to the invention for a data storage manager to receive a read or write request from a storage user that is directed to a raw DSU mapping and convert it into a corresponding read or write request to the corresponding raw DSU.

FIGS. 4, 5 and 6 illustrate methods that may be incorporated into existing data storage managers to implement one embodiment of the invention to use raw DSU mappings to enable software entities to access raw data storage devices and/or portions of raw data storage devices. First, FIG. 4 illustrates a method that may be used to create a raw DSU mapping, such as the RDM 100. The method of FIG. 4 begins at an initial step 200.

Next, at a step 202, the data storage manager 50C scans data storage devices that are accessible through the data storage interface 76 in a conventional manner and determines all accessible DSUs. This step is typically performed each time the computer 10S is rebooted, and it may also be performed at other times. The data storage manager typically provides a nonpersistent name for each DSU, such as the /dev names that are used in Linux. These nonpersistent names may be saved in the hint field 110A of a raw DSU mapping, as described above. The data storage manager also resolves multiple paths to the same data storage device, as necessary. This process of resolving multiple paths to a data storage device was described in U.S. patent application Ser. No. 10/665,779 ("Storage Multipath Management in a Virtual Computer System"), which is incorporated here by reference.

The data storage manager 50C makes the nonpersistent device names available for use in the creation of raw DSU mappings. For example, in one embodiment, the data storage manager may provide a list of accessible DSUs to a system administrator, so that the system administrator may determine the raw devices for which raw DSU mappings should be made, if any. The data storage manager may also provide additional information, such as raw DSU mappings that have already been created and the offset and length of any extents that have already been created within a raw DSU through an existing raw DSU mapping. In the system of FIG. 3A, for example, the data storage manager 50C might list the DSUs 31A, 31B and 31C. This step 202 may be performed by the storage device manager 55A, the storage path manager 56A and the HBA driver 58A within the data storage manager. This step is generally already implemented in many existing data storage managers, except for aspects that are unique to the creation and use of raw DSU mappings. Also, additional modifications may be made to these existing implementations to further benefit from this invention, as described below.

Next, at a step 204, the data storage manager 50C receives a request for the creation of a raw DSU mapping for a particular raw DSU, along with other information for creating the raw DSU mapping. For example, the data storage manager may receive information about credentials that a user must possess in order to use the raw DSU mapping to access the raw DSU. The data storage manager may also receive additional information, such as an extent offset and length for limiting access to the raw DSU and other optional attributes for the raw DSU mapping. For example, a system administrator may use the information provided in the step 202 to select a raw DSU for which to create a raw DSU mapping, and the system administrator may provide other information relevant to the raw DSU mapping. The step 204 may be performed, in particular, by the file system manager 54A, for example. In the system of FIG. 3A, for example, a system administrator might request that a raw DSU mapping be created for the raw DSU 31C, with an extent offset and an extent length corresponding to the extent 39C, and specifying that the name of the raw DSU mapping file is "RDMfilename" and that the extent may only be accessed by the storage user 70.

Next, at a step 206, the data storage manager 50C determines a unique, persistent ID for the raw DSU for which the raw DSU mapping is to be created, and the data storage manager determines the storage capacity for the DSU. For example, the data storage manager may retrieve the unique ID and the storage capacity of the DSU from the relevant data storage device. The unique ID may comprise a device ID, such as a SCSI disk ID, or a unique LUN ID, for example. The unique ID may also include an extra "disk model" field or some other distinguishing information because, although IDs may be unique for a given model or manufacturer, they may not be unique across multiple manufacturers or models. The step 206 may be performed, in particular, by the file system manager 54A and the storage device manager 55A, for example. In the system of FIG. 3A, for example, the data storage manager might retrieve a unique ID for the raw DSU 31C from the DSU 31C, along with the storage capacity of the DSU.

Next, at a step 208, the data storage manager 50C creates a file that constitutes the raw DSU mapping within an accessible file system. The step 208 may be performed, in particular, by the file system manager 54A, for example. The raw DSU mapping file may have an ordinary file structure and an ordinary file name, according to the conventions of the file system, and the file will be identified within the file system just like any other file. The data storage manager then adds data to the raw DSU mapping file, such as the RDM flag 102 and the DSU ID 104. The unique ID retrieved at the step 206 is written to the DSU ID field 104. If an extent is to be mapped, then the data storage manager may also add the extent offset 106 and the extent length 108 to the raw DSU mapping. The data storage manager may also add additional attributes 110, such as a hint field 110A, along with extra permissions information 110B and locking fields 110C. Data for the extent offset 106, the extent length 108, and the attribute fields 110 may have been received at the step 204, for example.

In the system of FIG. 3A, for example, the data storage manager 50C might create the RDM 100, giving it an ordinary, persistent file name such as "RDMfilename." The data storage manager might then add to the RDM 100 the RDM flag 102, the DSU ID 104 of the raw DSU 31C, the extent offset 106 and the extent length 108 corresponding to the extent 39C. The data storage manager might also add various attributes 110. For example, the data storage manager might add a current nonpersistent device name, such as /dev3, to the hint field 110A, and the data storage manager might add extra permissions information to the permissions field 110B, indicating that the extent 39C may only be accessed by the storage user 70. A raw DSU mapping file "maps" to the DSU that is identified in its DSU ID field 104 or, if an extent is defined within the raw DSU mapping by the extent offset 106 and the extent length 108, then the raw DSU mapping "maps" to that extent. The RDM 100 is now completed and the method of FIG. 4 terminates at a step 210.

Once a raw DSU mapping is created within a file system, it may be presented for use by user-level software. As described further below, the raw DSU mapping appears to be an ordinary file within the file system, with an ordinary, persistent file name, which may be identified through the file system allowing the raw DSU mapping to be opened, written to, read from, and closed, in a conventional manner, just like any other file in the file system. As also described below, however, the raw DSU mapping file appears to the user-level software to be as large as the raw DSU or extent to which the raw DSU mapping maps. When user-level software attempts to write to or read from a raw DSU mapping, the attempted access is actually redirected to the DSU or extent to which the raw DSU mapping maps.

In the system of FIG. 3A, for example, suppose the RDM 100 maps to the extent 39C of the raw DSU 31C. The RDM 100 appears to the storage user 70 as if it is an ordinary file within the file system 36 having the name RDMfilename, which may be opened, written to, read from and closed in a conventional manner. The RDM 100 appears to the storage user 70 to be as large as the extent 39C, however. If the storage user 70 attempts to access the RDM 100, the attempted accesses are redirected to the extent 39C.

Now suppose the storage user 70 attempts to open the RDM 100. The storage user may make such an attempt in the same manner that the storage user would attempt to open any other file in the file system 36. For example, in a generalized system, the storage user 70 might issue a file command such as "open(RDMfilename, accesstype)," where the "accesstype" may be read, write, read-write, exclusive, etc. FIG. 5 illustrates a method that may be performed by the data storage manager 50C in response to such an attempt to open the RDM 100.

FIG. 5 begins at an initial step 230. Next, at a step 232, the data storage manager 50C receives a command to open the raw DSU mapping file, RDM 100, such as described above. When the data storage manager receives a command to open a file, the data storage manager typically does not know whether the requested file is a raw DSU mapping. If this is the case, then the data storage manager checks the RDM flag 102, or other file-type indicator, of the file that is to be opened to determine its type. If the file were not a raw DSU mapping, the data storage manager would respond in a conventional manner to open the requested file. On the other hand, when the file to be opened is a raw DSU mapping, the data storage manager continues with the method of FIG. 5.

Next, at a step 234, the data storage manager 50C reads the RDM 100 to retrieve the ID for the raw DSU to which the RDM 100 maps from the DSU ID field 104. In the ongoing example, the data storage manager retrieves the ID for the raw DSU 31C from the DSU ID field 104 of the RDM 100. The steps 232 and 234 may be performed, in particular, by the file system manager 54A, for example.

Next, at a step 235, the data storage manager 50C, and, in particular, the file system manager 54A, may read the extra permissions information 110B and determine whether any restrictions on the use of the raw DSU mapping 100 are satisfied. If a restriction is not satisfied, an error may be reported and the method of FIG. 5 may be aborted. The data storage manager 50C may also attempt to obtain a lock for the raw DSU 31C at this point, using the locking data 110C. If another host has already opened the raw DSU mapping 100, for example, the storage user 70 may have to wait to gain access.

Next, at a step 236, the data storage manager 50C attempts to resolve the ID retrieved from the RDM 100 to a current, nonpersistent name for the DSU having the retrieved ID. The data storage manager may first check the DSU having a nonpersistent name that matches the hint field 110A to determine whether it has the ID from the RDM 100, as described above. Otherwise, the data storage manager implements a function to resolve the ID from the RDM 100 to a current name of a DSU. This function of resolving IDs to device names is provided by many existing data storage managers, and it can be added to other data storage managers in a conventional manner. The step 236 may be performed, in particular, by the storage device manager 55A, for example. As described above in connection with the step 202 of FIG. 4, each time the computer 10S is rebooted, the computer 10S scans for accessible data storage devices and names the discovered devices with a nonpersistent name. As described above, in the Background of the Invention section of this patent, if the data storage devices have been scanned again since the creation of the RDM 100, then the nonpersistent name of the raw DSU to which the RDM 100 maps may be different from what it was when the RDM 100 was created. For example, when the RDM 100 was created, the raw DSU 31C may have had a nonpersistent name of /dev2, while, when the step 236 is performed, the same raw DSU 31C may have a nonpersistent name of /dev3. In this case, the step 236 would resolve the ID of the DSU 31C to the current name for that DSU, namely /dev3. This ability to resolve IDs to current names is particularly advantageous in a virtual computer system because disk assignments are much more dynamic in a virtual computer system than they are in a computer system that does not include a virtual computer system. If the data storage manager 50C is unable to resolve the ID to a current name of a DSU, such as in the case of the desired DSU having been removed from the computer system, then an error is reported and the method of FIG. 5 is aborted.

Next, at a step 238, the data storage manager 50C uses the nonpersistent DSU name determined in the step 236 to open the DSU to which the raw DSU mapping maps. This step may be performed in a conventional manner, in particular, by the storage device manager 55A, for example. Opening the DSU returns a handle in a conventional manner. The handle, which may be used to access the raw DSU, preferably works with multipath software. This handle for the raw DSU is referred to herein as a "raw handle." In this ongoing example, the step 238 returns a raw handle for the raw DSU 31C, which may be used to access that DSU. Next, at a step 240, the data storage manager 50C stores the raw handle returned in the step 238 in a file descriptor in a conventional manner. The step 240 may be performed, in particular, by the file system manager 54A, for example.

Next, at a step 242, the data storage manager 50C uses the raw handle to obtain the capacity of the referenced raw DSU, typically from the DSU itself. This function of obtaining capacities for referenced DSUs is provided by many existing data storage managers, and it can be added to other data storage managers in a conventional manner. The step 242 may be performed, in particular, by the file system manager 54A and the storage device manager 55A, for example. In the ongoing example, the data storage manager uses the raw handle for the raw DSU 31C to request the capacity of the DSU from the DSU. Next, at a step 244, the data storage manager 50C confirms that any extent defined in the RDM 100 fits entirely within the referenced raw DSU. Thus, the data storage manager reads the extent offset 106 and the extent length 108 from the RDM 100. If the sum of the extent length and the extent offset is within the capacity of the referenced raw DSU, then the method of FIG. 5 proceeds. Otherwise, an error condition is reported. The step 244 may be performed, in particular, by the file system manager 54A, for example. In the ongoing example, the data storage manager confirms that the extent 39C is completely within the raw DSU 31C, based on the capacity of the DSU 31C determined at the step 242 and the definition of the extent 39C within the RDM 100.

Next, at a step 246, the data storage manager 50C returns an ordinary file handle for the RDM 100 to the storage user 70. This handle for the RDM 100 is referred to as a "RDM file handle." The RDM file handle may be the same as a conventional file handle, such as a file handle that might be returned for the file 40 of FIG. 3A, for example. Thus, from the perspective of the storage user 70, the data storage manager has simply fulfilled its request to open the RDM 100. The storage user 70 has no knowledge of the opening of the raw DSU 31C. As described below, the storage user 70 may now use the RDM file handle returned in the step 246 in a conventional manner. To the storage user 70, it will appear that accesses using the RDM file handle are applied to the RDM 100, however, in reality, such accesses are redirected to the raw DSU 31C, as described below. The step 246 may be performed, in particular, by the file system manager 54A, for example. The method of FIG. 5 terminates at a step 248.

Now suppose the storage user 70 uses the RDM file handle returned in the step 246 to attempt to read from or write to the RDM 100. Again, the storage user may make such an attempt in the same manner that the storage user would attempt to access any other file in the file system 36. For example, in a generalized system, the storage user 70 might issue a file command such as "read(RDM file handle, RDMoffset, Buffer, Length)," where the RDM file handle is the handle returned at the step 246 of FIG. 5, the RDMoffset indicates the offset to the data blocks desired by the storage user, the Buffer indicates a buffer into which the data is to be read and the Length indicates the amount of data to be read. From the perspective of the storage user, the RDMoffset represents the offset to the desired data blocks within the RDM 100, which the storage user believes to be the size of the raw DSU or extent to which the raw DSU mapping maps. However, as described below, the RDMoffset is actually used as an offset to corresponding data blocks within the raw DSU or extent to which the raw DSU mapping maps. FIG. 6 illustrates a method that may be performed by the data storage manager 50C in response to such an attempt to access the RDM 100.

FIG. 6 begins at an initial step 270. Next, at a step 272, the data storage manager 50C receives a command to access the raw DSU mapping file, RDM 100, such as described above. The step 272 may be performed, in particular, by the file system manager 54A, for example. As described above, the command received at the step 272 includes the RDM file handle for the RDM 100 and an offset to a data block within the RDM 100, from the perspective of the storage user 70. Thus, the offset received with the command to access the RDM is referred to as the "RDM offset." Continuing the example from above, suppose the storage user 70 attempts to access the RDM 100, which maps to the extent 39C in the raw DSU 31C. In this case, the RDM offset should be less than the extent length 108 of the extent 39C.

Next, at a step 274, the data storage manager 50C reads the RDM 100 to retrieve data required to respond to the data access request, including the extent offset 106 and the extent length 108 if an extent is involved, and possibly also some permissions information 110B and some locking data 110C. Alternatively, the data storage manager 50C may cache the RDM data in the RDM file handle, so it does not have to read the RDM 100 each time the storage user 70 attempts to access its data in the raw DSU 31C. The step 274 may be performed, in particular, by the file system manager 54A, for example. In the ongoing example, the data storage manager retrieves the extent offset 106 and the extent length 108 of the extent 39C.

Next, at a step 276, the data storage manager 50C calculates a "raw DSU offset" by adding the RDM offset to the extent offset 106 from the RDM 100. If, however, the attempted access relates to an entire DSU, without being limited to an extent, then the raw DSU offset is set equal to the RDM offset (or the extent offset is set to zero). The raw DSU offset represents an offset into the raw DSU to the data block to which the attempted access is to be directed. The step 276 may be performed, in particular, by the file system manager 54A, for example.

Next, at a step 278, the data storage manager 50C determines whether the attempted access is allowable. If the RDM 100 includes an extent, then the data storage manager determines whether the raw DSU offset points to a data block within the extent. If an extent is not involved, then the data storage manager determines whether the raw DSU offset points to a data block within the raw DSU. If the attempted access is not within the extent or the entire DSU, whichever applies, then the attempted access is not allowed. At this point, the data storage manager may also verify that the extra permissions 110B required for accessing the extent or raw DSU are satisfied, although this permissions check is normally performed when the raw DSU mapping 100 is opened, as described above. The step 278 may be performed, in particular, by the file system manager 54A, for example. In the ongoing example, because the storage user 70 is permitted to access the extent 39C, as long as the attempted access is to a data block within the extent 39C, the attempted access is allowed. If the attempted access is not allowed, the method of FIG. 6 proceeds to a step 280. If the attempted access is allowed, the method of FIG. 6 proceeds to a step 282.

At the step 280, the data storage manager 50C reports a read or write error, as appropriate, in a conventional manner. The step 280 may be performed, in particular, by the file system manager 54A, for example. After the step 280, the method proceeds to a terminal step 284.

At the step 282, the data storage manager 50C converts or translates the attempted access that was directed to the RDM 100, at the RDM offset, into an attempted access that is directed to the extent or raw DSU to which the RDM 100 maps, at the raw DSU offset. The data storage manager issues the translated request, in a conventional manner, over the data storage interface 76 using the raw handle received at the step 238 of FIG. 5. The step 282 may be performed, in particular, by the file system manager 54A and the storage device manager 55A, for example. In the ongoing example, the data storage manager uses the raw handle for the raw DSU 31C to attempt an access to the extent 39C at the raw DSU offset. After the step 282, the method of FIG. 6 terminates at the step 284.

With a data storage manager 50C implementing the methods of FIGS. 4, 5 and 6, the storage user 70 can access a raw DSU, or an extent of a raw DSU, that is mapped by a raw DSU mapping. From the perspective of the storage user, the accesses are to the raw DSU mapping file, which appears to be an ordinary file, with the size of the raw DSU or extent. In reality, the storage user is accessing the raw DSU or extent itself. As described above, from the storage user's perspective, the raw DSU mapping file can be opened and accessed in a conventional manner, although these actions are actually applied to the underlying raw DSU or extent.

The storage user 70 can also close the raw DSU mapping in a conventional manner, which results in the raw DSU being closed. More specifically, the storage user may issue a file close command in a conventional manner, using the RDM file handle. When the data storage manager receives a file close command directed to a raw DSU mapping, the data storage manager closes the corresponding raw DSU, using the appropriate raw handle. Thus, the storage user 70 may open, access and close raw DSU mappings, which results in the opening, accessing and closing of the raw DSUs and/or extents to which the raw DSU mappings map. In this manner, the storage user 70 may interact with a raw DSU or extent as if it is an ordinary file in a file system. The storage user 70 may benefit from many of the advantages of using a file system, while still having access to a raw DSU and the benefits that derive therefrom.

One important aspect of the invention is that it implements a dynamic name resolution capability, which provides access to a raw data storage device, or a portion thereof, with the use of a file system RDM name that persists across reboots, host configuration changes, path changes and storage reconfiguration. User-level software will always be able to access the raw DSU using the same file system name, which is actually the name of the RDM. In the system of FIG. 1A, for example, if a raw DSU mapping is added to the file system 36 that maps to the entire raw LUN 34C, then the application 12A on the computer 10A may access the raw LUN using a persistent name. If the computer 10A is rebooted, for example, the application 12A will still be able to access its data on the raw LUN 34C, even if the accessible storage devices are discovered in a different order from the previous scanning of storage devices. Also, unlike prior art systems, the invention enables multiple host computers to resolve the same raw DSU through multiple storage paths. The multiple host computers are able to access the raw DSU mapping to obtain the unique ID for the raw DSU and resolve it to whatever device name is used in a particular host computer, regardless of which path is used to reach the raw DSU.

The invention also enables the use of raw DSUs under a distributed locking mechanism such as one of the locking mechanisms described in the '613 application. The data fields used in those mechanisms may be placed in a raw DSU mapping file for implementing a lock for a corresponding raw DSU or extent. Before a storage user may access a raw DSU or extent that is mapped by a raw DSU mapping that implements a lock, the storage user must first obtain the corresponding lock in the raw DSU mapping by writing to the owner and time fields, as described in the '613 application. If the lock is not available for the type of use desired, as indicated by the lock fields in the raw DSU mapping, then the storage user must wait until it is able to obtain the lock before it can use the raw DSU or extent. Use of the distributed locking system is particularly useful in a virtual computer system, where the configuration and location of VMs is very dynamic. This implementation of a distributed locking system is advantageous because it only involves manipulating data in the partition 35A, which is formatted by the system software 72, instead of accessing any part of the extent 39C or the raw DSU 34C, which is a "black box" to the system software.

Also, the invention allows the use of raw DSUs to be governed by a persistent local and global access control mechanism that is valid across reboots. In prior art systems, a single user might obtain different access rights after different reboots of a single host computer, or the user might obtain different access rights depending on which host computer is used. Using the invention, and storing a raw DSU mapping in a distributed file system enables multiple host computers to go through common access checks, based on common, persistent permissions information stored in the raw DSU mapping. A user will be given the same access rights, as specified in the raw DSU mapping, regardless of how many times a host computer is rebooted and regardless of which host computer is used.

The invention also allows for the storage of additional metadata related to the contents or attributes of a raw DSU. This additional metadata may be used for a wide variety of other purposes as provided by numerous existing file system managers. For example, a raw DSU mapping file can indicate whether a corresponding raw DSU is bootable. The additional metadata may also be used to store information supplied by an application or other storage user, describing the current contents of the raw DSU, for example.

The invention also enables more advanced file functions to be applied to raw DSUs. For example, COW technology cannot be applied directly to a raw DSU without hardware support, because there is no obvious place to store the copied (modified) data blocks. The technology can be applied to a raw DSU mapping, however, which effectively applies the technology to the underlying raw DSU or extent. For example, a redo log may be created for a raw DSU mapping file in the same file system as the raw DSU mapping file, so that subsequent accesses to the raw DSU mapping file are directed to the redo log. So long as a storage user is reading unmodified data blocks from the redo log, the desired data is actually read from the corresponding raw DSU or extent, through the raw DSU mapping, and there is no need to copy the data to the redo log. If a storage user writes a block of data, however, the data is written to the redo log, and not to the corresponding raw DSU or extent. Then, any subsequent read of a block of data that has been written to the redo log will be read directly from the redo log, instead of from the corresponding raw DSU or extent. Then, if the redo log is subsequently committed, all data blocks in the redo log are written to the corresponding blocks of the raw DSU or extent. Using the invention, COW technology may be used with raw DSUs for a variety of purposes, such as to create a hierarchy of checkpoints and undo/redo information, and to provide incremental backups, all without hardware support.

The invention is particularly advantageous when implemented in a virtual computer system, such as the virtual computer system of FIG. 2. In such a computer system, a raw DSU mapping file may be presented to a VMM as an ordinary file in an accessible file system. The VMM may use the raw DSU mapping in a conventional manner, not realizing that the actual data accesses are being redirected to a raw DSU. The VMM may then virtualize the storage that appears to exist in the raw DSU mapping in any of various ways for use by a supported VM. For example, the VMM may virtualize a HBA, using the HBA emulator 66, so that the data storage appears to the VM to be a LUN contained within an attached SAN. Alternatively, the VMM may export to the VM a local storage device within the virtual hardware 60 that is backed by a raw DSU mapping and, ultimately, a raw DSU.

In any case, a virtual computer system may comprise multiple physical computers, with each physical computer hosting one or more VMs. In this case, a single raw device in a SAN, such as a raw disk, may be divided into multiple extents, for use by multiple VMs on the multiple physical computers. Some of these extents may be restricted for use by a single VM, so that each VM is isolated from the other VMs with respect to access to private data storage areas. The use of access rights and extent limits prevent one VM from accessing the private data of another VM. Thus, if a VM attempts to access an extent using a raw DSU mapping for which it does not have f permission, or if the VM attempts to access a data block that is outside of the extent that is defined by its own raw DSU mapping, then the attempted access will be blocked at the step 278 of FIG. 6.

Adding COW capabilities to the use of raw DSUs also facilitates checkpointing VMs that use such raw DSUs. For example, this invention may be combined with the checkpointing technology described in U.S. patent application Ser. No. 10/750,919 ("the '919 application"), entitled "Generating and Using Checkpoints in a Virtual Computer System", which is incorporated here by reference. The added COW functionality also enables VMs to access raw DSUs or extents in nonpersistent, undoable or append modes.

Also, one or more extents may be shared between multiple VMs using a distributed locking mechanism, such as described above. Adding the COW functionality and the distributed locking mechanism also enable more advanced virtualization functions to be applied to VMs that use raw DSUs. For example, a VM that uses a raw DSU that is shared between multiple physical computers may be migrated from one physical computer to another using the techniques described in U.S. patent application Ser. No. 10/319,217 ("the '217 application"), entitled "Virtual Machine Migration", which is incorporated here by reference. Such migration can cause data corruption due to a lack of distributed locking, if done on a raw DSU directly.

What is claimed is:

1. A computer program embodied in a tangible, computer-readable medium, the computer program performing a method for providing access to a raw data storage unit (DSU) in a computer system, the computer system comprising a computer, a system-formatted DSU containing a file system, the raw DSU having a unique identification (ID), and one or more data storage interfaces for providing one or more storage users within the computer with access to the system-formatted DSU and the raw DSU, the method comprising:

creating a raw DSU mapping (RDM) file with a persistent name within the file system on the system-formatted DSU, the RDM containing the unique ID of the raw DSU and an indicator indicating that the file is a RDM;

resolving the unique ID to a current name for the raw DSU;

receiving an attempted access to the RDM file at a RDM offset; and sending a corresponding attempted access to the raw DSU at a raw DSU offset, the raw DSU offset corresponding to the RDM offset.

2. The computer program of claim 1, wherein the raw DSU is an entire data storage device.

3. The computer program of claim 1, wherein the raw DSU is a logical unit number (LUN) within a data storage device comprising multiple LUNs.

4. The computer program of claim 3, wherein the raw DSU and the system-formatted DSU are in different data storage devices.

5. The computer program of claim 1, wherein the raw DSU and the system-formatted DSU are both LUNs within a storage area network (SAN).

6. The computer program of claim 1, wherein an extent is defined within the RDM as a portion of the raw DSU and wherein the method further comprises blocking attempted accesses to the RDM that would access data outside of the extent.

7. The computer program of claim 6, wherein the raw DSU offset is determined by adding the RDM offset to an extent offset.

8. The computer program of claim 1, wherein the RDM also contains permissions information for restricting access to the raw DSU, the method further comprising blocking attempted accesses to the RDM that do not satisfy the restriction of the permissions information.

9. The computer program of claim 1, wherein the RDM also contains locking data for a distributed locking system, the method further comprising obtaining a lock for the raw DSU prior to attempting to access the raw DSU.

10. The computer program of claim 1, further comprising using copy-on-write (COW) technology with the RDM file, in a manner that effectively uses COW technology with the raw DSU.

11. The computer program of claim 1, wherein a virtual computer system is implemented within the computer.

* * * * *

UNITED STATES PATENT AND TRADEMARK OFFICE
CERTIFICATE OF CORRECTION

PATENT NO. : 7,269,683 B1
APPLICATION NO. : 11/643072
DATED : September 11, 2007
INVENTOR(S) : Satyam B. Vaghani et al.

It is certified that error appears in the above-identified patent and that said Letters Patent is hereby corrected as shown below:

Title page item (73) Assignee, change

"VM Ware, Inc., Palo Alto, CA (US)"

to

--VMware, Inc., Palo Alto, CA (US)--

Signed and Sealed this

Twenty-second Day of September, 2009

David J. Kappos
*Director of the United States Patent and Trademark Office*